United States Patent
Bhardwaj et al.

(10) Patent No.: US 11,321,887 B2
(45) Date of Patent: May 3, 2022

(54) ARTICLE DESIGN

(71) Applicant: ACCENTURE GLOBAL SOLUTIONS LIMITED, Dublin (IE)

(72) Inventors: Nitish Bhardwaj, Bangalore (IN); Sakshi Jain, Bangalore (IN); Kumar Abhinav, Hazaribag (IN); Suma Mani Kuriakose, Mumbai (IN); Veenu Arora, Sriganganagar (IN); Alpana Dubey, Bangalore (IN); Dhruv Bajpai, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 16/724,975

(22) Filed: Dec. 23, 2019

(65) Prior Publication Data
US 2020/0202598 A1  Jun. 25, 2020

(30) Foreign Application Priority Data
Dec. 24, 2018 (IN) .............................. 201811048963

(51) Int. Cl.
*G06T 11/60* (2006.01)
*G06T 5/50* (2006.01)
(Continued)

(52) U.S. Cl.
CPC .............. *G06T 11/60* (2013.01); *G06F 30/10* (2020.01); *G06Q 30/0202* (2013.01);
(Continued)

(58) Field of Classification Search
CPC ............ G06T 11/60; G06T 7/11; G06F 30/10; G06Q 30/0202
See application file for complete search history.

(56) References Cited

U.S. PATENT DOCUMENTS 9,524,522 B2 * 12/2016 Kirkby ............... G06Q 30/0631
9,947,022 B1 * 4/2018 Shariff ................. G06Q 10/067
(Continued)

FOREIGN PATENT DOCUMENTS

CN         102663092 A  *  9/2012
WO    WO-0067200 A2  * 11/2000   .......... G06K 9/6229

OTHER PUBLICATIONS

Yang, Shan, et al. "Detailed garment recovery from a single-view image." arXiv preprint arXiv:1608.01250 (2016).*
(Continued)

*Primary Examiner* — Sarah Lhymn
(74) *Attorney, Agent, or Firm* — Mannava & Kang, P.C.

(57) ABSTRACT

Examples of article designing are described herein. In an example, image data, margin data, and sales data corresponding to a plurality of articles may be obtained. The obtained data may be analyzed to identify a first article image of a first article and a second article image of a second article. The first article image is integrated with the second article image, based on an article attribute to generate a transformed article image. The article attribute may be an attribute having a maximum likelihood of making the article popular. The transformed article image may be filtered based on predefined filtering rules to obtain a curated article design image. The curated article design image is assessed to generate a design score indicative of a popularity and/or a sellability of an article, and a design of the article may be selected for a post design selection process, based on the design score.

14 Claims, 9 Drawing Sheets

(51) Int. Cl.
*G06T 7/11* (2017.01)
*G06Q 30/02* (2012.01)
*G06F 30/10* (2020.01)
*G06Q 30/06* (2012.01)
G06N 3/08 (2006.01)
G06N 3/04 (2006.01)

(52) U.S. Cl.
CPC ........... *G06Q 30/0621* (2013.01); *G06T 5/50* (2013.01); *G06T 7/11* (2017.01); *G06N 3/04* (2013.01); *G06N 3/08* (2013.01); *G06T 2207/20221* (2013.01)

(56) References Cited

U.S. PATENT DOCUMENTS

| | | | | |
|---|---|---|---|---|
| 10,558,925 | B1* | 2/2020 | Flor | G06Q 30/0202 |
| 2010/0205039 | A1* | 8/2010 | Basak | G06Q 10/04 |
| | | | | 705/7.31 |
| 2011/0184806 | A1* | 7/2011 | Chen | G06Q 30/0257 |
| | | | | 705/347 |
| 2012/0290517 | A1* | 11/2012 | Frank | G06N 20/00 |
| | | | | 706/12 |
| 2012/0303412 | A1* | 11/2012 | Etzioni | G06Q 30/06 |
| | | | | 705/7.31 |
| 2012/0303615 | A1* | 11/2012 | Goswami | G06N 5/048 |
| | | | | 707/723 |
| 2014/0108094 | A1* | 4/2014 | Beddo | G06N 3/086 |
| | | | | 705/7.31 |
| 2016/0063065 | A1* | 3/2016 | Khatri | G06Q 30/02 |
| | | | | 707/723 |
| 2018/0046926 | A1* | 2/2018 | Achin | G06Q 10/04 |
| 2018/0060744 | A1* | 3/2018 | Achin | G06N 5/02 |
| 2019/0130425 | A1* | 5/2019 | Lei | G06Q 10/0631 |
| 2019/0205905 | A1* | 7/2019 | Raghunathan | G06N 3/0454 |
| 2020/0104775 | A1* | 4/2020 | Chintalapati | G06F 9/451 |
| 2020/0334919 | A1* | 10/2020 | Bowen | G06T 11/60 |

OTHER PUBLICATIONS

Caro, Felipe, and Victor Martínez-de-Albéniz. "Fast fashion: Business model overview and research opportunities." Retail supply chain management. Springer, Boston, MA, 2015. 237-264.*

Da Silva Alves, Nelson. "Predicting product sales in fashion retailing: a data analytics approach." (2017).*

Kota HARA et al., "Fashion Apparel Detection: The Role of Deep Convolutional Neural Network and Pose-dependent Priors", IEEE Winter Conference on Applications of Computer Vision (WACV) 2016, 9 pages.

Chen, Kuan-Ting, and Jiebo Luo. "When Fashion Meets Big Data: Discriminative Mining of Best Selling Clothing Features." Proceedings of the 26th International Conference on World Wide Web Companion. International World Wide Web Conferences Steering Committee, 2017, 8 pages.

Gatys, L.A., Ecker, A.S., Bethge, M.: Image style transfer using convolutional neural networks. In: CVPR. (2016), pp. 2414-2423.

Li, Yijun, et al. "A closed-form solution to photorealistic image stylization." arXiv preprint arXiv:1802.06474 (2018), 23 pages.

He, Kaiming, et al. "Mask R-CNN." Computer Vision (ICCV), 2017 IEEE International Conference on. IEEE, 2017, pp. 2961-2969.

* cited by examiner

ARTICLE DESIGN

PRIORITY CLAIM

This application claims priority to Indian provisional application number 201811048963 filed on Dec. 24, 2018, the contents of which are incorporated by reference in their entirety herein.

BACKGROUND

In recent years, the retail industry has gained widespread popularity due to advancement in technology as well as ease of accessibility. Customers these days have endless options to buy various products from the comfort of their homes. For example, a customer can shop for apparels, footwear, accessories, home décor items or a piece of furniture from a wide range of options available online, without physically visiting a retail outlet. Other factors, such as improved security of payments, easy and quick delivery of products and better return policies have significantly contributed to popularity of the online retail industry. Generally, specialty stores either have their own website or partner with a popular online shopping website to sell a particular product(s) to the customers.

The retail industry is evolving at a rapid pace with more companies launching new product designs in a short span of time. To entice the customers, ecommerce portals frequently provide deals and discounts for buying products from their portal. The customers have also developed fashion interests that are short lived and may change over a short period. These factors have made the retail industry dynamic and competitive. Due to the competition and changing customer preferences, many ecommerce portals face an issue of unsold inventory of products that may impact the business and incur losses.

To have profitable sales, retailers have to keep up with the changing demands and interests of the customers and may have to continuously work on understanding dynamic customer interests and designing products to meet such interests. Existing systems for assessing customer interests and demands focus on a personalization aspect where product recommendations are made to customers based on previous orders placed or products liked by the customers.

Recommendations may also be provided based on segmentation of product attributes on high level features, such as clothing, bags or accessories analyzed from images shown to the customer. The systems may also rely on categorizing a clothing dataset into various categories based on selling frequency of clothes.

However, such systems are inefficient in identifying customer interests and designing products that may be popular and in demand for a large number of customers. Further, designing products is a tedious and time-consuming process and susceptible to errors and defects due to a high reliance on manual inputs. In addition, it may be cumbersome and not always plausible to effectively adapt to ever changing customer interests and requirements.

The present disclosure provides a technical solution to a problem to understand customer preferences to dynamically and efficiently design products that may be in demand.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for designing articles for customers. According to an example of the present disclosure, an article designing system may be used for generating new designs of an article. The article may refer to a product to be sold, for instance on a web portal. Examples of an article include, but are not limited to, apparel, footwear, an accessory, furniture, a decor item, or a toy. For the sake of explanation, the working of the article designing system is described in four phases: determining article attributes of popular articles; generating new designs; curating new designs; and generating a design score indicative of at least one of a popularity and a sellability of the new designs. Based on the design score, the curated article design may be selected for a post design selection process, such as approval for manufacturing, manufacturing, and the like.

In the first phase, for determining the article attribute, image data, margin data, and sales data related to the articles may be obtained. The image data may include a plurality of article images of different types of articles having different designs, patterns, and colors, and belonging to different categories of customers depending on a customer's gender, customer's age, and customer's location. The margin data may refer to information related to gross margin a retailer receives when selling products. The gross margin is a difference between the retail price of an article and the costs of the article sold. The sales data may refer to statistical information related to the amount of total sale of a particular article within a particular time duration. The margin data and the sales data may include data related to one or more of cost of the articles, brand of the articles, and an option of paying through monthly installments. The image data may be analyzed based on the margin data and the sales data to identify popular articles and corresponding article images, based on a popularity score.

The popularity score and thus the popular articles may be identified based on a selling frequency of the articles, number of times the articles have been liked or recommended by customers, and total revenues generated by the sale of the articles. From the article images of the popular articles a corresponding article attribute may be identified. An article attribute may relate to aesthetics of the article, for example, the article attribute may be a design, a shape, a silhouette, a color, a print, and/or a pattern of the article.

In the second phase, a transformed article image, based on a combination of the first article image and the second article image with respect to the article attribute may be generated. For example, a new article image may be generated based on the first and the second articles images and the corresponding article attribute of the first and the second articles. In an example, enhanced Artificial Intelligence (AI) techniques may be used to generate the new article images. In another example, Deep Neural Networks (DNN) may be used for generating the new article images. To generate a new article image, a first article image may be merged with a second article image based on the article attribute of a first article and a second article. In an example, the first article image may be an article image identified from the image data and is referred to as a content image, and the second article image may be, for instance, a popular article image or a reference image referred to as a style image. The merging of the first article image and the second article image may generate the new article image having the article attribute(s) of the first article image and the second article image.

In an example, colors, patterns and prints of one or more article images may be integrated into the new article images. For instance, an article image of a popular article may have red as a prominent color and a millefleur print or a floral print. This red color and the floral print may be added to the new article image to enhance image and generate a transformed article image.

In the third phase, the transformed article image may be filtered based on predefined filtering rules to obtain a curated article design image. The predefined filtering rules may include rules to check if segments of the transformed article images are correctly arranged, the transformed article images are of a particular size, resolution and clarity, and the transformed article images are not distorted. In another example, predefined rules for curating may be based on a feedback-based knowledge repository. The knowledge repository may be enriched, implicitly and/or explicitly. Predefined implicit rules can be created from the most sellable and popular styles and any combination thereof. Predefined explicit rules can be obtained from users' feedback, a stylists' recommendation, or any other feedback. A segment may be a part of an article. For example, if the article is apparel, segments of the apparel may include a silhouette, a collar, a neck pattern, a print, a hemline, a right sleeve, a left sleeve, a right shoulder, and a left shoulder. In one example, where the transformed article image is an image of a dress, the transformed article image may be checked to determine whether the segments like sleeves, collar and neckline of the dress are correctly positioned. If the position of the segments is incorrect, the process of obtaining a transformed article image may be repeated. In another example, a user may modify design or print from the transformed article image by adding more colors as per a designer's preference, to obtain the curated article design image.

In the fourth phase, the curated article design image may be assessed based on the article attribute to generate a design score predicting popularity and sellability of an article and a design of the article may be identified based on the design score. For instance, a first curated article design image having a design score of 85 may have high sales potential than a second curated article design image having a design score of 70. The article designing system may perform this assessment for a plurality of curated article design images and assign the design score to each curated article design image. Based on the design score, each of the curated article design images may be ranked, and a decision may then be made to design articles based on curated article design images having high ranks. In an example, to ensure maximum efficiency, designs of the curated article design images having design scores above 90 may be identified, and used for article designing. Thus, curated article designs may be selected based on the design scores, associated ranks, and predefined threshold for a design score.

The system of the present disclosure provides an efficient technique of designing articles to meet customer interests. The system provides techniques for reducing design lifecycle. Further, the system provides a convenient platform for designers to view and curate articles as per their preference thereby enhancing the overall designer experience. In addition, the system effectively identifies and adapts to dynamic customer needs and interests, to provide error-proof product designs that may be popular and in demand.

Figure 1:
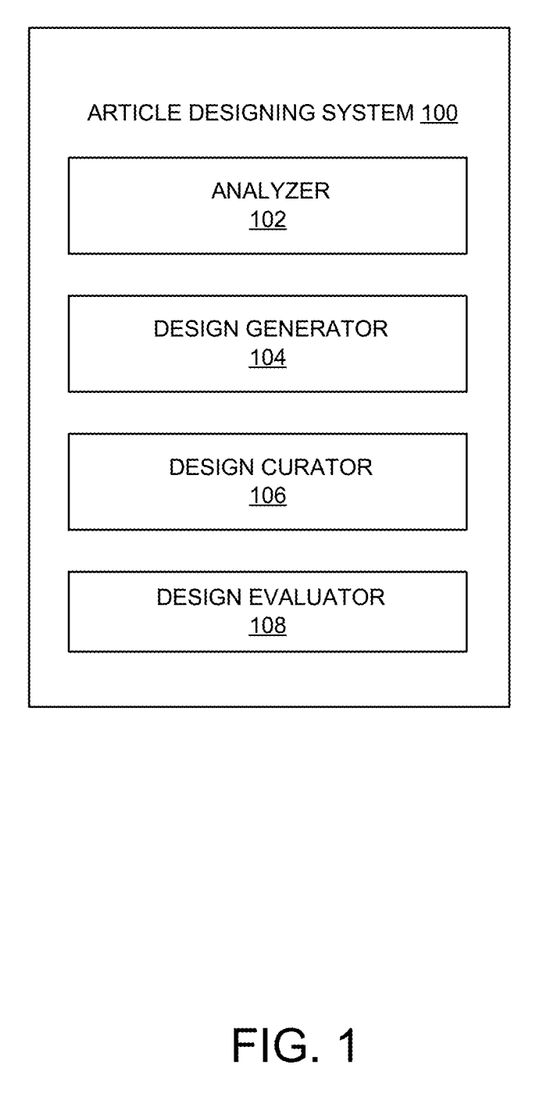
FIG. 1 illustrates a block diagram of an article designing system, according to an example embodiment of the present disclosure.

FIG. 1 illustrates an article designing system 100 that may be used for designing different types of articles, according to an example of the present disclosure. The present description has been explained in considerable detail with respect to designing of articles for customers. The system 100 may include an analyzer 102, a design generator 104, a design curator 106, and a design evaluator 108, which may be in communication with each other.

In an example embodiment, the analyzer 102 may obtain image data, margin data, and sales data corresponding to multiple articles available for purchase or already sold. The image data, in an example, may include a variety of article images corresponding to the articles, which may different aesthetic appeal defined by way of article attributes. The article images in the image data may also be categorized, for instance, based on a type of an article, a user gender, a user age, a user location, a price range, and the like. The analyzer 102 may analyze the margin data and the sales data corresponding to the plurality of articles to identify popular articles and detect article attributes of the popular articles. The article attribute may include features, such as aesthetic features of an article, for example, a design, a shape, a color, a pattern, a silhouette, a collar, a neck type, a print, a hemline, sleeves and shoulders design.

In an example, the analyzer 102 identifies a first article image of a first article and a second article image of a second article, and a corresponding article attribute of the first article and the second article. In an example, a least popular article may be selected as the first article and a popular one as the second article. In other examples, any two articles, independent of popularity or sellability, may be selected as the first and the second articles, for instance, based on a stylist's choice.

Furthermore, in an example, an article attribute of the second image, interchangeably referred to as style image, which has a highest likelihood of making the article popular is identified. However, in other examples, the analyzer may select any other attribute as well in order to generate a new article, for example, based on a user's input or a knowledge repository having a design history associated with a category of the article.

The design generator 104 may generate a transformed article image based on the article attribute. The transformed article image may be generated based on one of merging article images of two popular articles or integrating style and design of one article image to another article image. In an example, the design generator 104 may merge the first article image with the second article image based on the article attribute of the first article and the second article to generate a new article image and integrate at least one of a color and a pattern to the new article image to obtain a transformed article image.

The design curator 106 may generate a curated article design image by filtering the transformed article image based on predefined filtering rules to check conformance with global standards set for an image of the article and local standards set for a given type of the article. In an example, the predefined filtering rules may include rules to check that segments of the transformed article images are correctly arranged, the transformed article images are of a particular size, resolution and clarity, and the transformed article images are not distorted. In one example, where the transformed article image is an image of a dress, the design curator 106 may check that the segments like sleeves, collar and neckline of the dress are correctly positioned in the transformed article image. If the position of the segments is incorrect, the transformed article image may be fed back to the design generator 104 to repeat process of obtaining a transformed article image.

In another example, the design curator 106 may share the transformed article image and receive a user input, such as a color palette or a different print, to modify the transformed article image. The transformed article image may then be modified to obtain a curated article design image by changing a color, a pattern or a print present in the transformed article image, based on the received user input. Other designs which may not be from the image data may be used to modify the transformed article image and obtain a curated article design image.

The design evaluator 108 may assess the curated article design image based on one or more article attributes corresponding to the curated article design image to generate a design score indicative of a popularity and sellability of an article. Based on the design score, selection regarding design of the article may be performed. The design evaluator 108 may compute the design score for a plurality of curated article design images to rank the curated article design images. The design score may be indicative of sales potential of the articles designed based on the curated article images, to meet demands and interests of the customers. In an example, the popularity of articles may be captured based on articles upvoted by customers on social media and ratings, number of articles sold, and revenues generated, and the sellability of articles may be captured based on attributes of the articles, cost of the articles, brand of the articles, whether the articles can be bought on installments, and position of the articles on a webpage (articles displayed on the top of a webpage have better selling opportunities). In one example, Deep Neural Network (DNN) models may be used to predict the popularity and the sellability of the curated article design image based on the article attribute of the curated article design image. Attribute, such as collarless, crew, basic band, sleeveless, and knitting may be fed to the deep neural network and popularity and sellability prediction may be obtained as the output.

The attribute may be represented as encoded vectors, such as, for instance, one-hot encoded vectors and may be fed to the dense layer of the DNN. The intermediate layers of the DNN may use a Rectified Linear Unit (ReLU) activation function and the output layer may use a softmax activation function for processing the encoded vectors. In an example, a separate multi layer perceptron model may be trained for the popularity and sellability prediction for the curated article design images. The curated article design images may be ranked based on the design score. A decision can then be made to design articles based on high ranked curated article design images. The various of components of the system 100 are explained in further detail below.

Figure 2:
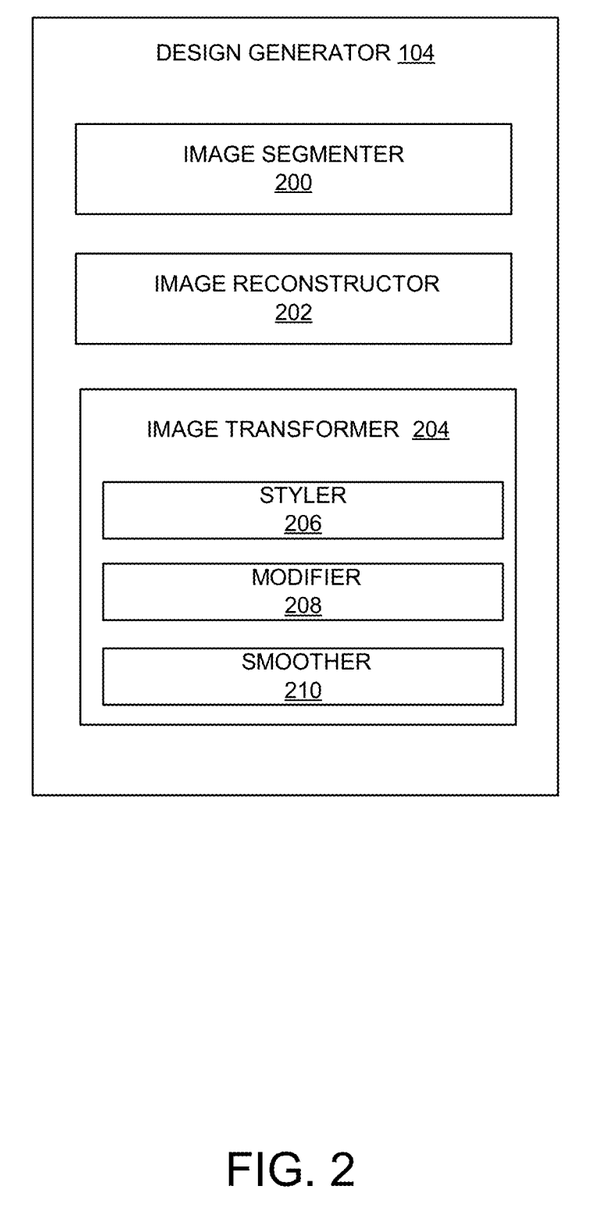
FIG. 2 illustrates a block diagram of a design generator, according to an example embodiment of the present disclosure.

FIG. 2 illustrates a block diagram of the design generator 104, according to an example embodiment of the present disclosure. In an example, the design generator 104 may generate the transformed article image by performing at least one of merging article attributes to obtain the new article image and by integrating colors and patterns to the new article image. The design generator 104 may include an image segmenter 200, an image reconstructor 202, and an image transformer 204. The image segmenter 200 may partition the first article image into a plurality of first segments, based on the article attribute of the first article, and partition the second article image into a plurality of second segments based on the article attribute of the second article. In an example, the image segmenter 200 may use a tagging tool to define regions, such as, neck, sleeve, front, back, etc., of the articles to train the segmentation model. The regions may be further augmented with related attributes and the segmentation model may be trained on this dataset.

The image reconstructor 202 may merge a segment from the plurality of first segments with a corresponding segment from the plurality of second segments to obtain the new article image, based on an article attribute. The article attribute used for merging may be an attribute having a maximum likelihood of making an article popular. The image transformer 204 may further process the new article image to obtain the transformed article image.

The image transformer 204 may include a styler 206, a modifier 208, and a smoother 210. The styler 206 may obtain a style image and extract an article attribute from the style image. The modifier 208 may modify the new article image based on the extracted at least one article attribute to obtain a styled article image. For instance, the modifier 208 may overlap the article attribute for a segment of the content image or the first image with the article attribute of the corresponding segment of the style image, i.e., second image. The smoother 210 may refine the styled article image by performing spatially consistent stylizations to obtain the transformed article image. In an example, the style image is a reference image obtained from the image data.

Figure 3:
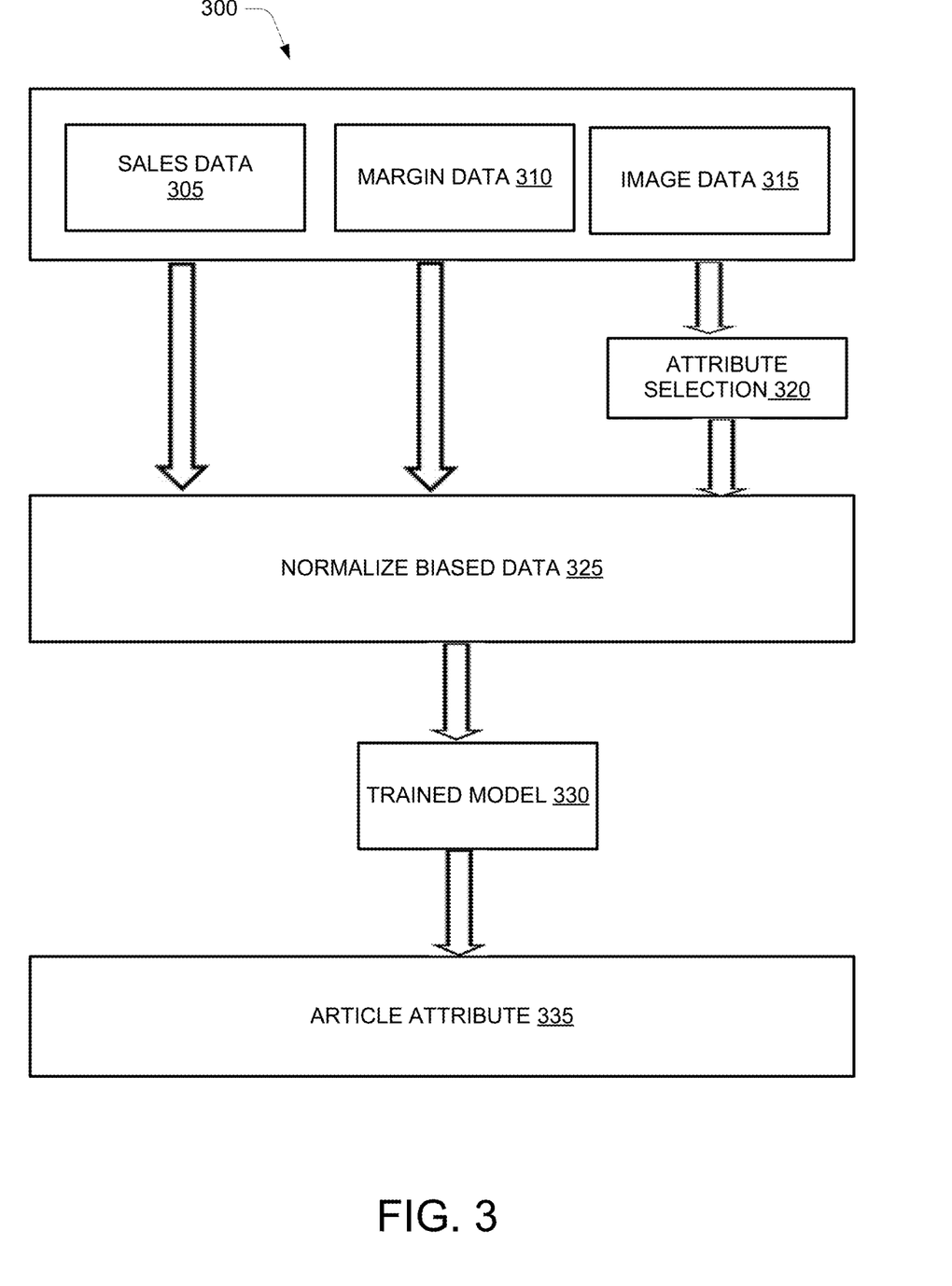
FIG. 3 illustrates a block diagram for analyzing data to identify an article attribute of popular articles, according to an example embodiment of the present disclosure.

FIG. 3 illustrates a block diagram 300 for analyzing data to identify article attribute of popular articles, according to an example embodiment of the present disclosure. Popularity of an article may be captured in multiple ways, such as number of articles sold, total revenue generated by the sale, article ratings of customer and number of customers providing positive feedback.

In an example, the sales data 305, the margins data 310 and the image data 315 may be provided for analysis. From the image data 315, attributes may be obtained for popular articles at block 320. For example, attributes that make an article popular may be obtained based on a quantity of article sold, revenue generated, and customer ratings.

Thereafter, at block 325, the biased data may be normalized. The biased data may be for instance, a selling frequency of one article, popularity of a particular design or a brand. For normalizing the biased data, the effect of the biased data may be determined. To determine the effects of biased data on popularity, a Random forest model may be applied. The Random forest model may be trained to predict popularity captured by number of articles sold. The model may be trained for all types of articles and categories within a particular type of article. For example, if the type of article is apparel, the model may be trained for fashion, such as men's shirts, women's top, and kid's dress. Features selected for training the Random forest model may be attributes and biased characteristics such as brand, cost of articles. To analyze the effects of different features on an article's popularity, an information gain of the different features may be computed.

The information gain may be indicative of an extent of influence of a corresponding feature on article's popularity. The information gain, in an example, may be computed using the random forest algorithm. If the information gain of the feature is high, the influence of the feature on the article's popularity is also high. One of ordinary skill in the art will appreciate that techniques other than the Random forest technique may be used to normalize the biased data.

In an example, a woman's top having a floral print may have features of full sleeves, hemline, brand XYZ, and cost 225 US Dollars (USD). Other features may include appearance of the top in the first page of search results, and availability of an Equated Monthly Installment (EMI) option for purchase. The features of the top may be provided to the Random forest algorithm for computing the information gain. In the example, the information gain for the top may be the sleeve having a value 0.2, the hemline having a value 0.02, the brand having 0.08, the cost having a value 0.1, the position in the first page of search results having a value 0.4 and the EMI having a value 0.2.

For normalizing the bias data, a trained model 330 may be used. The trained model 330 may use a linear equation for the training and normalizing of the bias data. The equation may be given as:

$$QS = b_0 + (\beta_1 c_1 + \beta_2 c_2 + \beta_3 c_3 + \ldots) - \alpha^2 \sum_{\forall b}(\gamma_1 b_1 + \gamma_2 b_2 + \ldots)$$

Where, $\beta$ represents model weights of the attributes, c represents the attributes of articles, $\alpha$ captures the average information gain of the biased terms, and b represents the value of biased data. The equation to predict quantity sold (QS) is solved using linear regression. The above linear equation penalizes biased terms to normalize their effect. The magnitude of the weights of the attributes represents significance of an attribute with quantity sold, also popularity measure, i.e. correlation between the attribute and popularity, such that higher the value of regression coefficients of the attributes, the higher is their effect on popularity.

Based on the trained model 330, most popular attribute, also referred to as article attribute 335 may be identified. The article attribute 335 of apparel may be, for instance, a particular floral print, long sleeves or a raised collar of the apparel. If the article is a furniture item, the article attribute 335 may be carvings on legs of the furniture item, color of the upholstery, shape of arms, or design of the backrest of the furniture item. The popular attribute 335 may be identified across different types of articles and categories within the types. For example, if the type of article is apparel, the categories may be men's clothing, women's clothing, and kids clothing.

Figure 4:
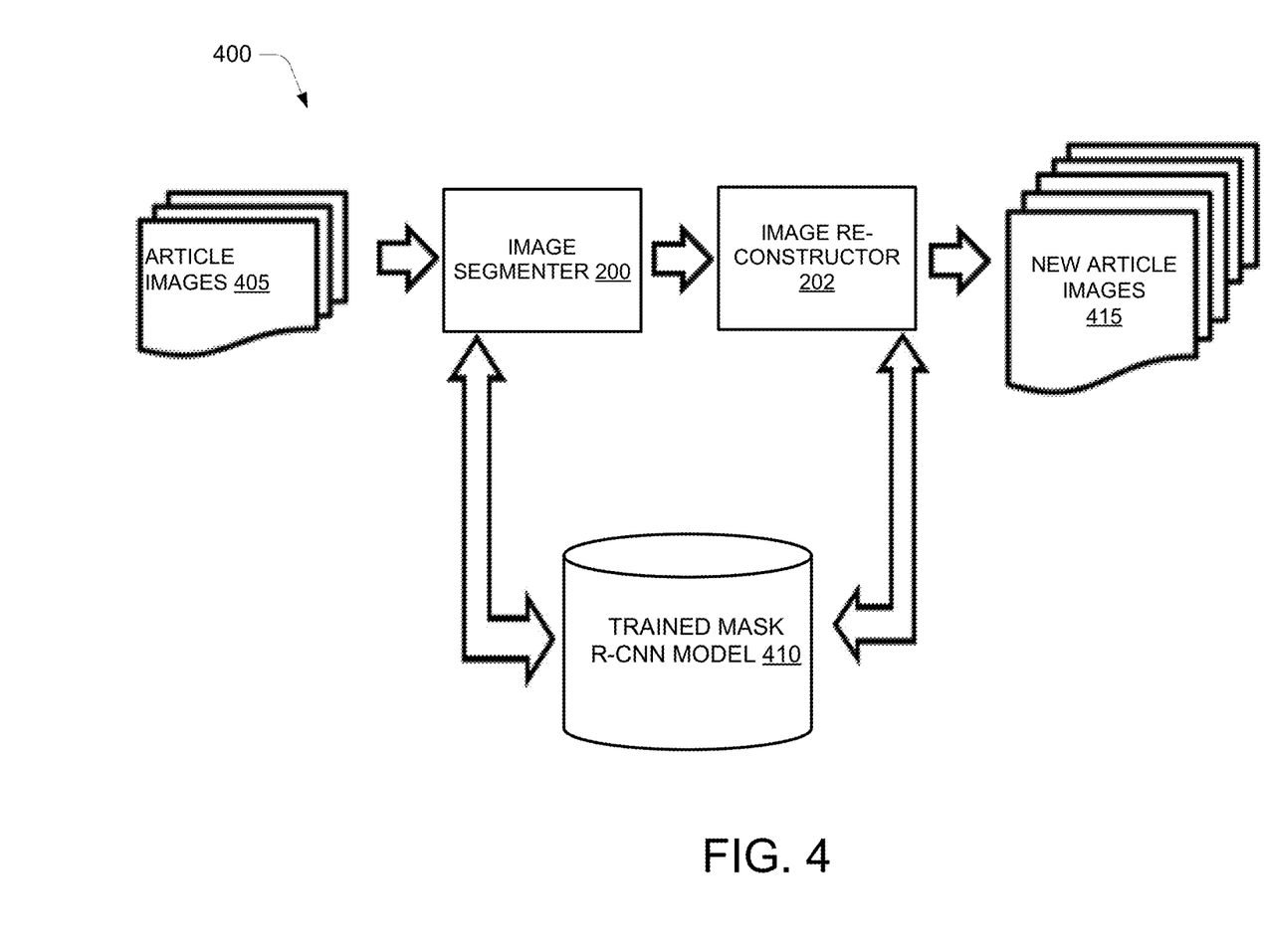
FIG. 4 illustrates a block diagram for generating new article images, according to an example embodiment of the present disclosure.

FIG. 4 illustrates a block diagram 400 for generating new article images 415, according to an example embodiment of the present disclosure. The article images 405 may be received. The article images 405 may be of multiple articles for customers of different ages, gender and locations and may be fetched from image data of the company, an online repository where the images may have been previously stored, or one or more websites of the company. The article may also be for different surroundings and climate such as winter and summer. After receiving the article images 405, image segmentation may be performed by the image segmenter 200. In image segmentation, an article image may be selected from the article images 405 and the article image may be partitioned into multiple segments based on the article attribute 335 corresponding to the article image, such that each segment includes one article attribute. For instance, if a first article image is that of a first dress, a right shoulder portion and a collar portion of the first dress in the first article image may be partitioned as two separate segments. Thereafter, one or more segments of the article image may either be replaced with one or more segments of another article image of a popular article, or the segments may be modified based on the article attribute 335. For instance, the collar portion of the first article image may be replaced with a collar portion of a second article image of a second dress which may be more popular. In another example, the collar portion of the first article image may be modified by the system 100 to match with a popular type of collar in article images of similar dresses.

In another example, new article images 415 may be generated by either merging one article image with another article image or by transforming generated designs by integrating different colors and patterns. For merging the article images, article images of two popular articles may be selected and segmented to obtain new article images using enhanced Artificial Intelligence (AI) techniques. For transforming the new article images, trending color(s) and pattern(s) may be identified based on trendspotting algorithms and may be integrated with the generated new article images using trained AI models to obtain transformed article images.

In an example embodiment of the present disclosure, a trained model, such as a trained mask Region Convolutional Neural Network (R-CNN) model 410 may be used with the image segmenter 200 for performing the image segmentation. The mask R-CNN model is a general framework for object instance segmentation and is a combination of faster R-CNN model that performs object detection based on a class and a bounding box and a Fully Convolutional Network (FCN) that performs pixel wise boundary. The R-CNN model 410 generates bounding boxes and segmentation masks for each instance of an object in an article image. The mask R-CNN consists of two stages, the first stage scans the article image and generates proposals for areas likely to contain an object. The second stage classifies the proposals and generates bounding boxes and masks. The R-CNN model 410 may have a Regional Proposal Network (RPN) to generate two outputs for each anchor, an anchor class and a bounding box, and a Region of Interest (ROI) classifier and a bounding box regressor to be used on regions of interest proposed by the RPN. The ROI classifier and the bounding box regressor may generate two outputs for each ROI.

Based on the trained R-CNN model 410 and the image segmentation, the article images 405 may be reconstructed by the image reconstructor 202. Thereafter, new article images 415 corresponding to the new designs of the articles may be created. The working of the image segmenter 200 and the image reconstructor 202 has been explained in detail with an example in FIG. 5.

Figure 5:
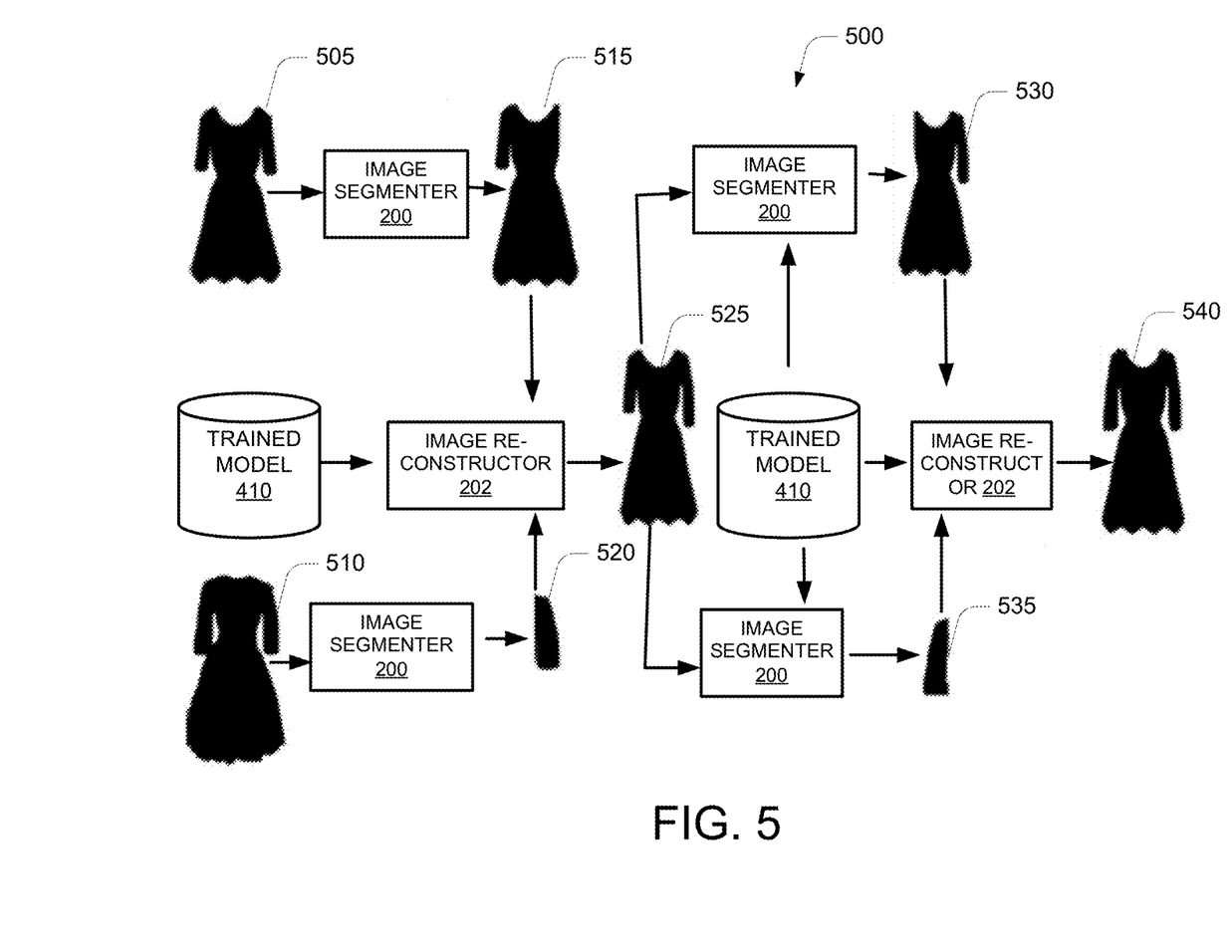
FIG. 5 illustrates an example operation of segmenting and reconstructing article images to obtain a new article image, according to an example embodiment of the present disclosure.

FIG. 5 illustrates an example operation 500 of segmenting and reconstructing article images to obtain a new article image, according to an example embodiment of the present disclosure. A first article image 505 and a second article image 510 of two similar articles may be selected. In this example, the article images are that of popular dresses. The first article image 505 may for instance be a dress with less popularity, also referred to as a content image and the second article image 510 may be of a more popular dress and referred to as a style image. In an example, an article attribute, such as the sleeves of the dress in the style image may be more popular and the sleeves of the content image may be overlaid or replaced by the sleeves of the style image.

The image segmentation may be performed by the image segmenter 200 on the first article image 505 to segment the left sleeve of the dress in the content image and then remove the segment to obtain the image 515. In an example, the image segmentation may be performed by training a DNN model based on Mask R-CNN architecture, trained to segment different components from the article images. The image 515 is the same first article image 505, but without the left sleeve. The image segmentation may also be performed for the dress in the second article image 510 to segment and separate the left sleeve from the dress in the style image to obtain the image 520.

After receiving the images 515 and 520, image reconstruction may be performed by the image reconstructor 202 on the images 515 and 520 to construct an image 525 based on image processing techniques. In one such technique, images may be reconstructed from segmented components from article images. The technique may use a segmented mask that may be overlaid on an article image of a dress or a component of the dress to generate an output image. The segmented mask may be overlaid by applying arithmetic operations such as, for example, an add operation on article images. The segmented mask may be a Boolean array having two values, true and false for each pixel. Based on the value of the pixel, the pixel may be included in the output image. For instance, a pixel having a false value may not be included in the output image and the pixel with a true value may be included in the output image.

In an example, the overlay of the segmented mask may be performed on an image of, for instance, a sleeve of a dress. The image of the sleeve may be selected, and the segmented mask may be overlaid on the image of sleeve based on an add operation. The overlay of the segmented mask on the image of sleeve may provide the output image. The output image has components of the image of sleeve for which the overlaid pixels of the segmented mask has a value of true or "1". The components of the image for which the overlaid pixels of the segmented mask have a value of false or "0" are not included in the output image.

Referring to FIG. 5, the foreground of the first article image 505 without a sleeve may be extracted as the image 515 and the background of the second article image 510 may be extracted as the image 520. Thereafter, the foreground image 515 may be added to the background image 520 to receive the output image 525. The output image 525 has the body and right sleeve of the dress in the first article image 505 but the left sleeve of the dress in the second article image 510. The steps of the process may be repeated for the right sleeve. The right sleeve may be segmented and removed from the output image 525 to obtain the image 530 and the right sleeve may be segmented and separated from the second article image 510 to obtain the image 535. Thereafter, based on the image reconstruction, the images 530 and 535 may be combined to obtain a new article image 540. In one example the trained model 410 may be utilized by the image reconstructor 202 to perform the image reconstruction. The new article image 540 may be the image that is obtained based on two dresses and has the article attribute 335 of sleeves. Therefore, the dress in the new article image 540 may have a high popularity and sellability.

Figure 6:
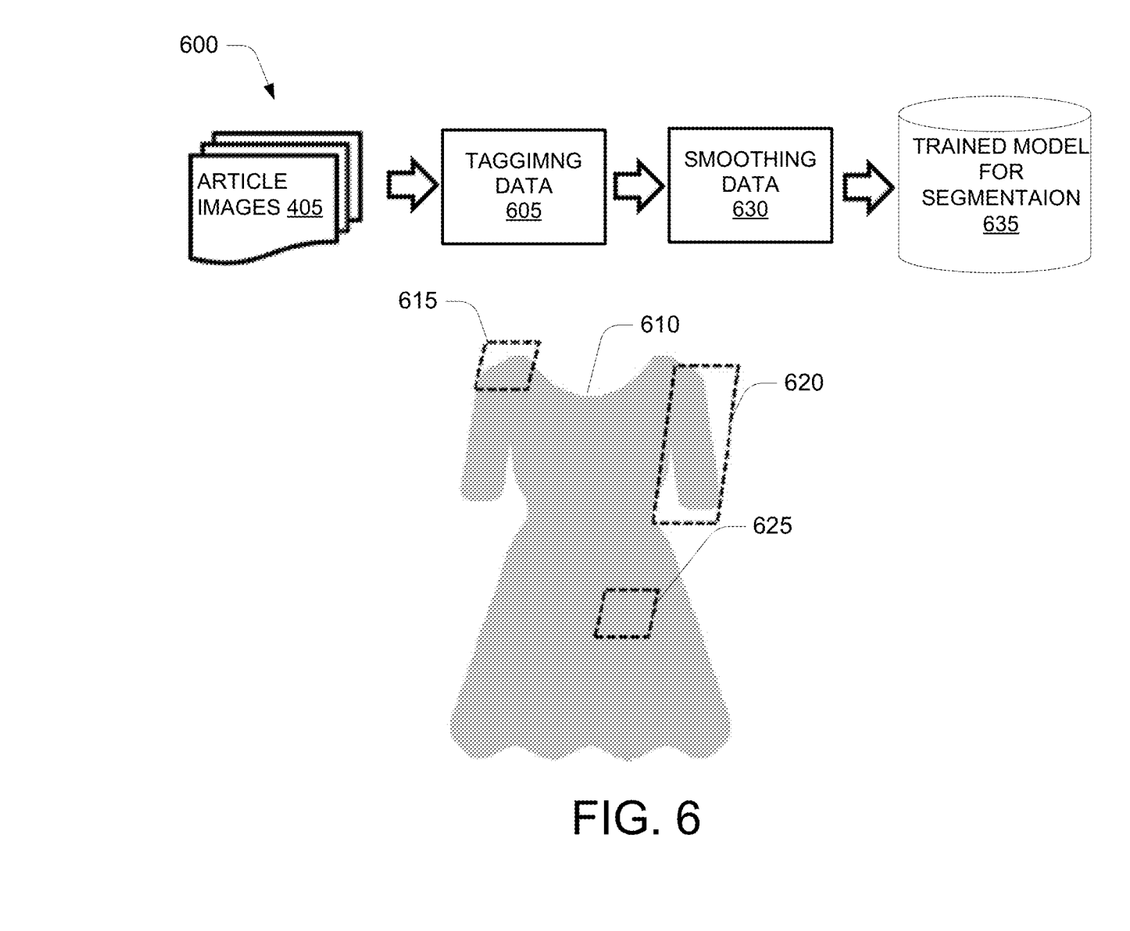
FIG. 6 illustrates a block diagram for training a model for segmenting article images, according to an example embodiment of the present disclosure.

FIG. 6 illustrates a block diagram 600 for training a model for segmenting article images, according to an example embodiment of the present disclosure. In an example, the article images 405 may be received from the image data 315, the online repository or a website of a company. After receiving the article images 405, tagging data 605 may be fetched from the article images 405. The tagging data 605 may include information for identifying different attributes of an article (a dress) 610 in an article image, and may be obtained based on tools, such as labelme or Visual Geometry Group (VGG) annotator. For instance, the tagging data 605 may include information regarding the shoulders 615, the sleeves 620 and color 625 of the dress 610 and other data, such as collar, silhouette, neck, print, and hemline. Thereafter, refining of the article images 405, also referred to as smoothing 630 may be performed based on the tagging data 605, and fed to the training model 635. The training model 635 may then be utilized for segmenting the article images 405.

Figure 7:
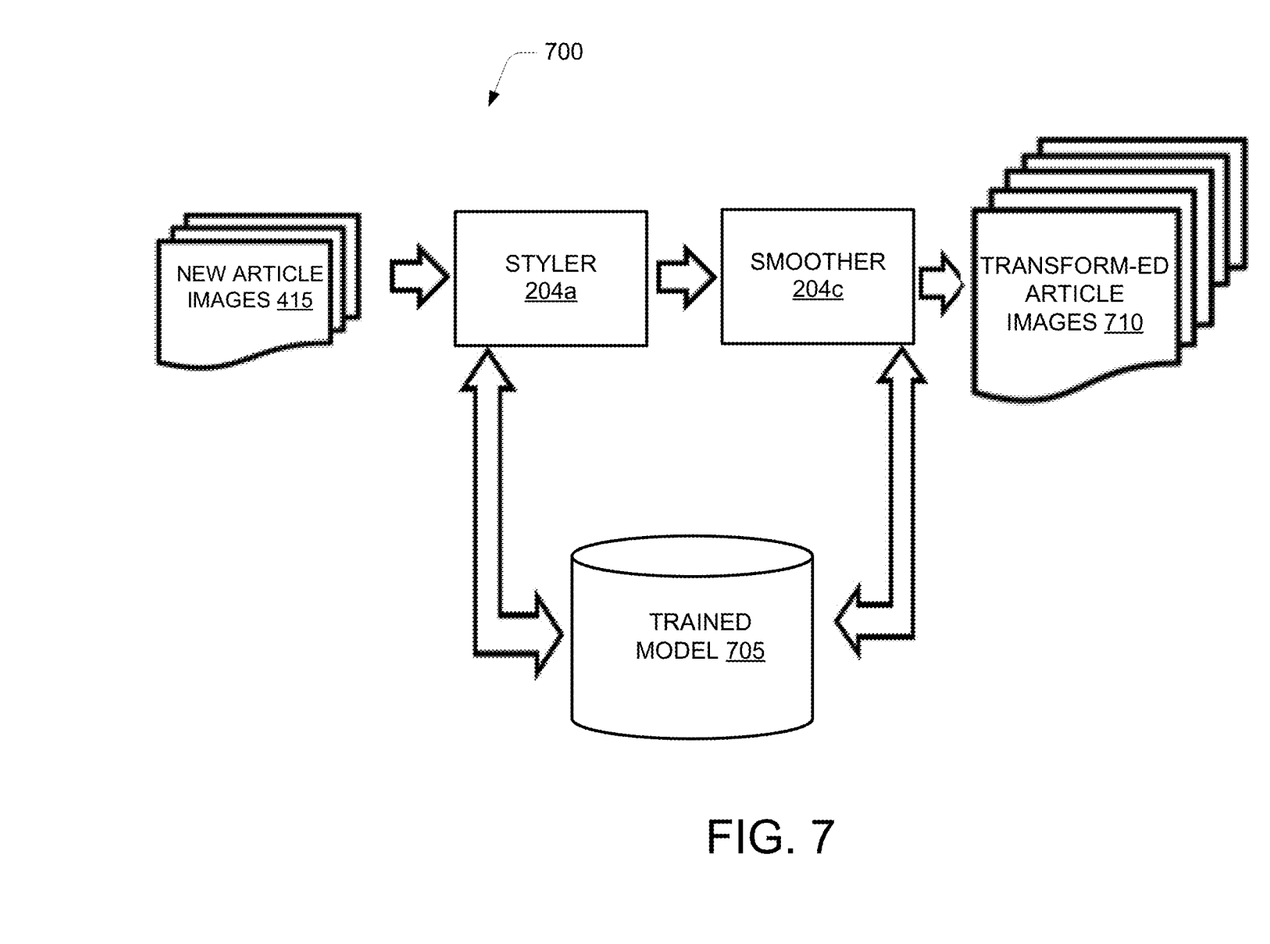
FIG. 7 illustrates a block diagram for generating transformed article images, according to an example embodiment of the present disclosure.

FIG. 7 illustrates a block diagram 700 for generating transformed article images 710, according to an example embodiment of the present disclosure. In an example, the new article images 415 may be received. In an example, the styler 206 and the modifier 208 may be used to style and modify the new article images 415. The styling may include extracting at least one attribute, for instance color, from a style image and modifying a content image based on the extracted attribute to obtain a styled article image. In an example, the styling may be performed by transferring style of a style image to a content image with a constraint that the content photo be photorealistic.

Thereafter, styled article images may be refined by the smoother 210 by applying a suitable style for smoothing. The smoothing ensures spatially consistent stylizations of the styled article images and may be performed based on a trained model 705, such as a trained signal Whitening and Coloring Transforms (WCT) model to obtain transformed article images 710.

In an example, an intermediate output or layers of the article images 415 may be obtained after performing the styling. The styling may be formulated as an image reconstruction process, with content features of the content image being transformed at the intermediate layers with reference to statistics of style features of the style image through feed-forward passes. In each intermediate layer, the content features are transformed such that the content features exhibit the same statistical characteristics as the style features at the same intermediate layer. In an example, the WCT model may be applied on the content features to achieve the same statistical characteristics.

For extracting and transforming the content features, a VGG-19 network may be used for extracting the content features as an encoder, and to train a symmetric decoder to invert the content features to an original image.

In another example, style transfer through styler 206 may be used for creating images for articles for which a corresponding digital image may be unavailable. For instance, fashion retailers require available inventory along with digital images of articles on their websites for customers to select and purchase, where the digital images are generally taken at a photo studio. However, often times when an article is available, corresponding digital image is not available. For example, blue and red shirts may be available; however, the digital images of the blue and red shirts may be unavailable. For such cases, an image for the article may be created by the styler 206 by styling process.

For creating the image, available images of articles may be selected. The available images may then be segregated for different color patterns on the image and then separated. Thereafter, the segregated color patterns may be replaced with new color patterns to create the image of an article. For instance, if an image of a red color pattern shirt is available, then the image may be segregated for the red color pattern and replaced with grey color pattern to create an image of the grey pattern shirt, which was previously unavailable.

Figure 8:
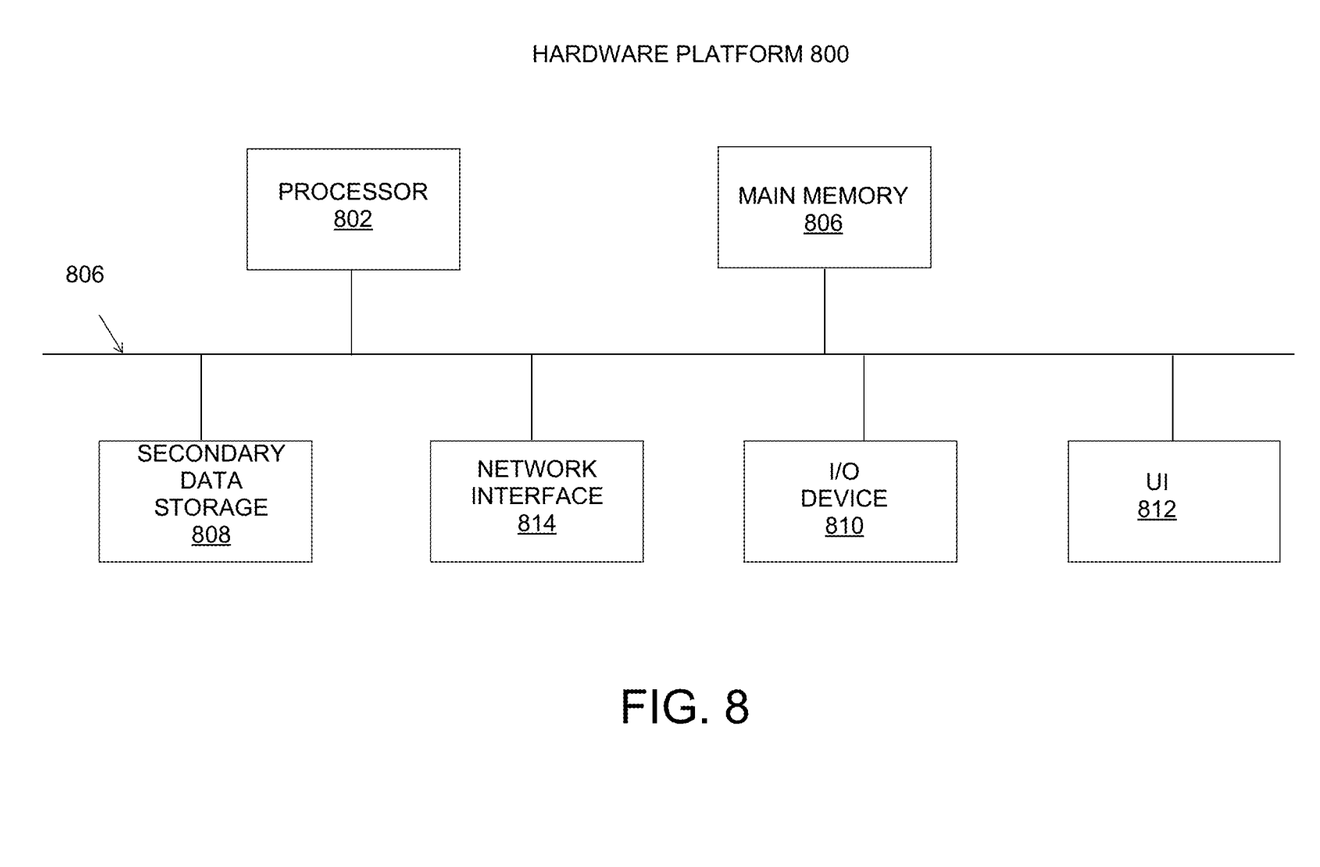
FIG. 8 illustrates a hardware platform, according to an example embodiment of the present disclosure.

FIG. 8 illustrates a hardware platform 800 for implementation of the system 100, according to an example of the present disclosure. In an example embodiment, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions, techniques and/or other processes described herein. Commands and data from the processor 802 may be communicated over a communication bus 804. The computer system 800 may also include a main memory 806, such as a random access memory (RAM), where the machine readable instructions and data for the processor 802 may reside during runtime, and secondary data storage 808, which may be non-volatile and stores machine readable instructions and data. The memory 806 and data storage 808 are examples of non-transitory computer readable mediums. The memory 806 and/or the secondary data storage 808 may store data used by the system 100, such as an object repository including web objects, configuration data, test data, etc.

The computer system 800 may include an Input/Output (I/O) device 810, such as a keyboard, a mouse, a display, etc. A user interface (UI) 812 can be a communication device that provides textual and graphical user interfaces to a user of the system 100. The UI 812 may operate with I/O device 810 to accept from and provide data to a user. The computer system 800 may include a network interface 814 for connecting to a network. Other known electronic components may be added or substituted in the computer system 800. The processor 802 may be designated as a hardware processor. The processor 802 may execute various components of the system 100 described above and perform the methods described below.

Figure 9:
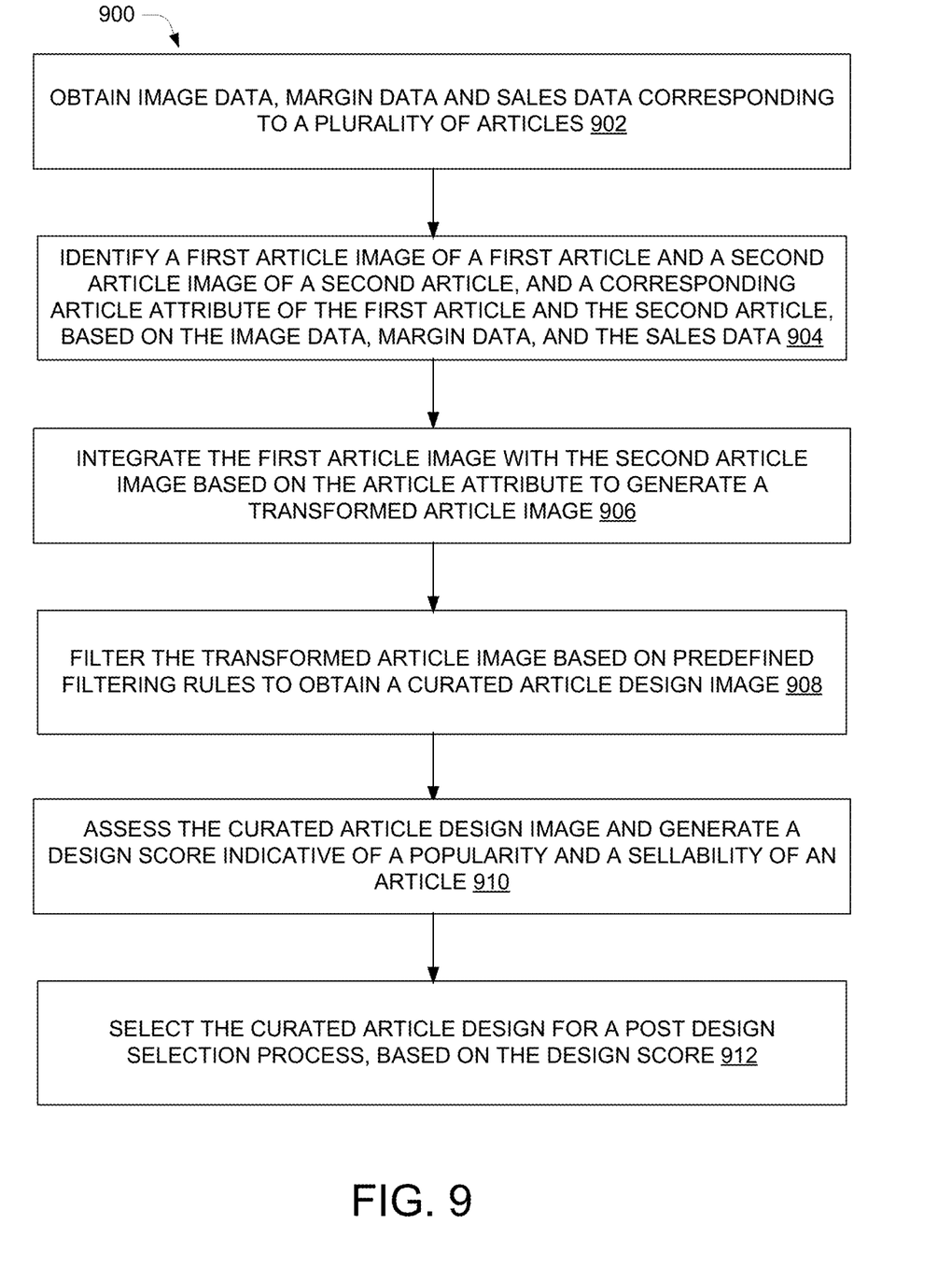
FIG. 9 illustrates a computer-implemented method for designing an article, according to an example embodiment of the present disclosure.

FIG. 9 illustrates a method 900 for designing articles, according to an example embodiment of the present disclosure. For the sake of brevity, construction and operational features of the system 100 which are explained in detail in the description of FIG. 1, FIG. 2, FIG. 3, FIG. 4, FIG. 5, FIG. 6, and FIG. 7 are not explained in detail in the description of FIG. 9.

At block 902, the method 900 commences with obtaining image data, margin data, and sales data corresponding to a plurality of articles. The image data, in an example, may include article images corresponding to a variety of articles having different designs and shapes. The image data may also include different articles with different categories, for example, the image data having article images of apparel may be categorized based on apparel different genders and age groups. The margin data and the sales data may include data related to cost of the articles, brand of the articles, an option of paying through monthly installments and position of the articles in a search listing. In an example, the analyzer 102 may receive the image data, the margins data and the sales data. In another example the image data may be stored in a repository within the system 100.

At block 904, a first article image of a first article and a second article image of a second article, and a corresponding article attribute of the first article and the second article may be identified, based on the image data, the margin data and the sales data. The image data may be analyzed to identify the attribute of the articles and the margin data and the sales data may be analyzed to identify the first article and the second article. For example, the first article may be an article with a popularity score lower than a threshold, while the second article may be an article with a higher popularity score. In an example, the analyzer 102 may analyze the image data, the margin data and the sales data.

Thereafter, the first article image and the second article may be combined or integrated, based on with the article attribute to generate a transformed article image, at block 906. In an example, the design generator 104 may merge the first article image and the second article image. The first article image may, for instance, be an image a less popular article from the image data, and the second article image may be of a popular article. For transforming, in an example, a new article image may be generated, based on replacing a segment from the plurality of first segments of the first article image with a segment from the plurality of second segments of the second article image to provide a new article image. The new article image may include the article attribute of the popular article. Further, in an example, at least one of a color and a pattern may be integrated to the new article image to obtain a transformed article image. In an example, the design generator 104 may integrate color(s) and pattern(s) to the new article image.

At block 908, the transformed article image may be filtered based on predefined filtering rules to obtain a curated article design image. In an example the design curator 106 filters the transformed article image. The predefined filtering rules may include rules to check that segments of the transformed article images are correctly arranged, the transformed article images are of a particular size, resolution and clarity, and the transformed article images are not distorted. In one example, where the transformed article image is an image of a dress, the design curator 106 may check that the segments like sleeves, collar and neckline of the dress are correctly positioned in the transformed article image. If the position of the segments is incorrect, the transformed article image may be fed back to the design generator 104 to repeat process of obtaining a transformed article image.

The curated article design image may be assessed at block 910. The curated article design image may be assessed by the design evaluator 108 to generate a design score predicting popularity and sellability of an article. In an example, the design evaluator 108 may assign the design score to the curated article design image.

At block 912, based on the design score, the curated design of the article is selected for post design selection processes, such as market analysis of the article, manufacturing, etc. In an example, the selection may include ranking the curated article design images, based on the design scores and selecting the curated design image with highest rank. Additionally, or alternatively, a threshold design score may be predefined and curate article design images having a design score higher than the threshold design score may be selected.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An article designing system comprising:
   a processor to:
   obtain image data, margin data, and sales data corresponding to a plurality of clothing articles;
   identify a first clothing article image of a first clothing article, a second clothing article image of a second clothing article, a first set of clothing article attributes corresponding to the first clothing article, and a second set of clothing article attributes corresponding to the second clothing article, based on the image data, the margin data, and the sales data, wherein each of the first and second sets of clothing article attributes is associated with a corresponding weight representing significance of the clothing article attribute with a popularity of the respective clothing article;
   partition the first clothing article image into a plurality of first segments and the second clothing article image into a plurality of second segments;
   determine biased characteristics from the image data, the margin data, and the sales data, wherein the biased characteristics comprise any one or a combination of a selling frequency of the first clothing article, a selling frequency of the second clothing article, a popularity of a particular design or brand of the first clothing article, and a popularity of a particular design or brand of the second clothing article;
   normalize the biased characteristics based on the clothing article attributes and the weights of clothing article attributes of the corresponding clothing article;
   identify a clothing article attribute, among the second set of clothing article attributes, having a maximum likelihood of making the second article popular, based on the normalization of the biased characteristics;
   merge a segment from the plurality of first segments with a corresponding segment from the plurality of second segments to provide a new clothing article image based on the identified clothing article attribute;
   filter the new clothing article image based on predefined filtering rules to obtain a curated clothing article design image;
   assess the curated clothing article design image to generate a design score indicative of a popularity and a sellability of the curated clothing article; and
   select the curated clothing article design for a post design selection process, based on the design score.

2. The system of claim 1, wherein the processor is further to:
   extract another clothing article attribute, among the second set of clothing article attributes corresponding to the second clothing article image;
   modify the new clothing article image based on the extracted clothing article attribute to obtain a styled clothing article image; and
   refine the styled article image by performing spatially consistent stylizations to provide a transformed clothing article image.

3. The system of claim 1, wherein the second clothing article has a popularity score higher than the first clothing article.

4. The system of claim 1, wherein the curated clothing article design is selected based on a comparison of the design score of the curated clothing article design with a predefined threshold design score.

5. The system of claim 1, wherein each of the second set of clothing article attributes is associated with a weight indicating a relation between the corresponding clothing article attribute and the popularity of the second article, and wherein the identification of the clothing article attribute, among the second set of clothing article attributes, is based on the weight associated with each of the second set of clothing article attributes, and wherein the clothing article attribute is identified based on at least one of a quantity of article sold, revenue generated, and customer ratings.

6. A method comprising:
   obtaining image data, margin data, and sales data corresponding to a plurality of clothing articles;
   identifying a first clothing article image of a first clothing article, a second clothing article image of a second clothing article, a first set of clothing article attributes corresponding to the first clothing article, and a second set of clothing article attributes corresponding to the second clothing article, based on the image data, the margin data, and the sales data, wherein each of the first and second sets of clothing article attributes is associated with a corresponding weight representing significance of the clothing article attribute with a popularity of the respective clothing article;
   partitioning the first clothing article image into a plurality of first segments and the second clothing article image into a plurality of second segments;
   determining biased characteristics from the image data, the margin data, and the sales data, wherein the biased characteristics comprise any one or a combination of a selling frequency of the first clothing article, a selling frequency of the second clothing article, a popularity of a particular design or brand of the first clothing article, and a popularity of a particular design or brand of the second clothing article;

normalizing the biased characteristics based on the clothing article attributes and the weights of clothing article attributes of the corresponding clothing article;

identifying a clothing article attribute, among the second set of clothing article attributes, having a maximum likelihood of making the second article popular, based on the normalization of the biased characteristics;

merging a segment from the plurality of first segments with a corresponding segment from the plurality of second segments to provide a new clothing article image based on the identified clothing article attribute;

filtering the new clothing article image based on predefined filtering rules to obtain a curated clothing article design image;

assessing the curated clothing article design image to generate a design score indicative of at least one of a popularity and a sellability of the curated clothing article; and selecting the curated clothing article design for a post design selection process, based on the design score.

7. The method of claim 6, wherein the integrating further comprises:

extracting another clothing article attribute, among the second set of clothing article attributes corresponding to the second clothing article image;

modifying the new clothing article image based on the extracted clothing article attribute to obtain a styled clothing article image; and refining the styled clothing article image by performing spatially consistent stylizations to provide a transformed clothing article image.

8. The method of claim 6, wherein the second clothing article has a popularity score higher than the first clothing article.

9. The method of claim 6, wherein each of the second set of clothing article attributes is associated with a weight indicating a relation between the corresponding clothing article attribute and the popularity of the second article, and wherein the identification of the clothing article attribute, among the second set of clothing article attributes, is based on the weight associated with each of the second set of clothing article attributes, and wherein the clothing article attribute is identified based on at least one of a quantity of article sold, revenue generated, and customer ratings.

10. The method of claim 6, wherein the selecting comprises:

ranking the curated clothing article design based on the design score; and comparing the design score of the curated clothing article design with a predefined threshold design score.

11. A non-transitory computer readable medium including machine readable instructions that are executable by a processor to:

obtain image data, margin data, and sales data corresponding to a plurality of clothing articles;

identify a first clothing article image of a first clothing article, a second clothing article image of a second clothing article, a first set of clothing article attributes corresponding to the first clothing article, and a second set of clothing article attributes corresponding to the second clothing article, based on the image data; the margin data, and the sales data, wherein each of the first and second sets of clothing article attributes is associated with a corresponding weight representing significance of the clothing article attribute with a popularity of the respective clothing article;

partition the first clothing article image into a plurality of first segments and the second clothing article image into a plurality of second segments;

determine biased characteristics from the image data, the margin data, and the sales data, wherein the biased characteristics comprise any one or a combination of a selling frequency of the first clothing article, a selling frequency of the second clothing article, a popularity of a particular design or brand of the first clothing article, and a popularity of a particular design or brand of the second clothing article;

normalize the biased characteristics based on the clothing article attributes and the weights of clothing article attributes of the corresponding clothing article;

identify a clothing article attribute, among the second set of clothing article attributes, having a maximum likelihood of making the second article popular, based on the normalization of the biased characteristics;

merge a segment from the plurality of first segments with a corresponding segment from the plurality of second segments to provide a new clothing article image based on the identified clothing article attribute;

filter the new clothing article image based on predefined filtering rules to obtain a curated clothing article design image;

assess the curated clothing article design image to generate a design score indicative of at least one of a popularity and a sellability of the curated clothing article; and select the curated clothing article design for a post design selection process, based on the design score.

12. The non-transitory computer readable medium of claim 11, wherein the processor is to:

extract another clothing article attribute, among the second set of clothing article attributes corresponding to the second clothing article image;

modify the new clothing article image based on the extracted clothing article attribute to obtain a styled clothing article image; and refine the styled article image by performing spatially consistent stylizations to provide a transformed clothing article image.

13. The non-transitory computer readable medium of claim 11, wherein the second clothing article has a popularity score higher than the first clothing article.

14. The non-transitory computer readable medium of claim 11, wherein each of the second set of clothing article attributes is associated with a weight indicating a relation between the corresponding clothing article attribute and the popularity of the second article, and wherein the identification of the clothing article attribute, among the second set of clothing article attributes, is based on the weight associated with each of the second set of clothing article attributes, and wherein the clothing article attribute is identified based on at least one of a quantity of article sold, revenue generated, and customer ratings.

* * * * *